(12) United States Patent
Franklin et al.

(10) Patent No.: US 8,499,288 B2
(45) Date of Patent: Jul. 30, 2013

(54) USER INTERFACE ANALYSIS MANAGEMENT

(75) Inventors: Timothy C. Franklin, Kirkland, WA (US); Oliver Szimmetat, Redmond, WA (US); Irina Catana, Seattle, WA (US); Beena Nair, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 12/782,770

(22) Filed: May 19, 2010

(65) Prior Publication Data

US 2011/0289481 A1  Nov. 24, 2011

(51) Int. Cl.
*G06F 9/44* (2006.01)
*G06F 3/00* (2006.01)

(52) U.S. Cl.
USPC .............................. 717/127; 717/124; 719/318

(58) Field of Classification Search
None
See application file for complete search history.

(56) References Cited

U.S. PATENT DOCUMENTS

| | | | |
|---|---|---|---|
| 5,781,720 A | 7/1998 | Parker et al. | |
| 6,438,745 B1* | 8/2002 | Kanamaru et al. | 717/137 |
| 6,907,546 B1 | 6/2005 | Haswell et al. | |
| 7,379,600 B2 | 5/2008 | Derks et al. | |
| 7,543,189 B2 | 6/2009 | Fichter et al. | |
| 7,954,090 B1* | 5/2011 | Qureshi et al. | 717/127 |
| 7,984,143 B2* | 7/2011 | Sullivan | 719/318 |
| 7,996,814 B1* | 8/2011 | Qureshi et al. | 717/127 |
| 8,001,527 B1* | 8/2011 | Qureshi et al. | 717/127 |
| 8,171,460 B2* | 5/2012 | Pizzoli et al. | 717/124 |
| 8,238,255 B2* | 8/2012 | Suresh et al. | 719/318 |
| 2002/0026631 A1* | 2/2002 | Barritz | 717/127 |
| 2003/0126307 A1* | 7/2003 | Lindner et al. | 709/318 |
| 2004/0073891 A1* | 4/2004 | Boucher | 717/127 |
| 2004/0268311 A1* | 12/2004 | Pizzoli et al. | 717/124 |
| 2005/0081115 A1* | 4/2005 | Cheng et al. | 714/47 |
| 2009/0276206 A1 | 11/2009 | Fitzpatrick et al. | |

OTHER PUBLICATIONS

Sudeep Pasricha and Nikil Duff; On-Chip Communication Architectures System on Chip Interconnect;2010; retrieved online on Apr. 29, 2013; pp. 403-437; Retrieved from the Internet: <URL: http://www.ece.rochester.edu/users/friedman/papers/MK_Chapter11_08.pdf>.*

Ray Ford; Monitoring Distributed Embeded Systems; 1990; retrieved online on Apr. 26, 2013; pp. 237-244; Retrieved from the Internet: <URL: http://ieeexplore.ieee.org/stamp/stamp.jsp?tp=&arnumber=82175>.*

(Continued)

*Primary Examiner* — Thuy Dao
*Assistant Examiner* — Hanh T Bui
(74) *Attorney, Agent, or Firm* — Ogilvie Law Firm (57) ABSTRACT

A target shim injected into a target process detects activity in a user interface and sets a target-busy status. A source shim injected into a source process detects the input being sent toward the target process to drive automated testing. The source shim determines that the target-busy status is set, and prevents the source process from sending the input until the status is clear. The target shim clears the status after confirming that a screen capture, accessibility test, localizability test, or other user interlace analysis operation has completed. Multiple source shims and/or multiple target shims may be present. Copies of a single automation shim component may be tailored for use as source shims or as target shims. Security processes and operating system processes may be listed to prevent interference from automation shims. User interface analysis module(s) may be loaded and/or unloaded "hot" while the target process is running.

20 Claims, 4 Drawing Sheets

OTHER PUBLICATIONS

Andrea Bosin et al.; A Service Based Approach to a New Generation of Intrusion Detection Systems; 2008; retrieved online on Apr. 26, 2013; pp. 215-224; Retrieved from the Internet: <URL: http://ieeexplore.ieee.org/stamp/stamp.jsp?tp=&arnumber=4711665>.*

Barkol, et al., "Semantic Automation from Screen Capture", Retrieved at <<http://www.hpl.hp.com/techreports/2009/HPL-2009-161.pdf>>, HPL-2009-161, Jul. 21, 2009, pp. 11.

Ladero, Jose M., "Automating Localization Testing", Retrieved at <<http://www.stickyminds.com/sitewide.asp?Function=edetail&ObjectType=ART&ObjectId=6281>>, Retrieved Date: Apr. 16, 2010, pp. 4.

"VistaTEC", Retrieved at <<http://www.vistatec.ie/en/Automation-Screenshooting.htm >>, Retrieved Date: Apr. 16, 2010, pp. 1.

"welocalize", Retrieved at <<http://www.welocalize.com/english/solutions/test.aspx >>, Retrieved Date: Apr. 16, 2010, pp. 2.

"Localization Testing", Retrieved at <<http://www.360logica.com/testing-services/localization-testing >>, Retrieved Date: Apr. 16, 2010, pp. 2.

"AutoIt", Retrieved at <<http://en.wikipedia.org/wiki/AutoIt >>, no later than Apr. 18, 2010, pp. 3.

"Detours—Microsoft Research", Retrieved at <<http://research.microsoft.com/en-us/projects/detours/ >>, copyright 2010, pp. 2.

"List of GUI testing tools", Retrieved at <<http://en.wikipedia.org/wiki/List_of_GUI_testing_tools >>, no later than Apr. 21, 2010, pp. 2.

"Microsoft UI Automation", Retrieved at <<http://en.wikipedia.org/wiki/Microsoft_UI_Automation>>, no later than Feb. 22, 2010, pp. 5.

"Test automation", Retrieved at <<http://en.wikipedia.org/wiki/Test_automation>>, no later than Apr. 26, 2010, pp. 4.

* cited by examiner

USER INTERFACE ANALYSIS MANAGEMENT

BACKGROUND

Test automation software can be used to perform tests on other software, such as application programs and web pages. Test automation software can also facilitate study of test outcomes, and promote other test control and test reporting goals. Test automation may help automate a manual process which is already available, at least in theory, but in practice manual tests are often labor-intensive and time-consuming. Automated tests can sometimes be performed more efficiently than manual tests, thereby making it possible to perform more extensive testing.

One approach to test automation includes code-driven testing, in which interfaces to classes, modules, libraries, and other software components are tested with a various input arguments to detect errors. Another approach to test automation includes graphical user interface (GUI) testing. A testing framework generates actual or simulated GUI input, such as keystrokes, mouse clicks, and other events, and observes the resulting changes in the user interface to detect errors. Some automation tools allow testers to interactively record user actions and replay them to compare actual results with expected results. Some tools build a model of the application that is being tested, and allow testers to create test cases by editing parameters and conditions. Testing tools may help automate tasks such as product installation, test data creation, and defect logging, without necessarily fully automating all tests.

SUMMARY

Some automation approaches rapidly transmit a stream of inputs to a product in order to test the product's functionality as quickly as possible. Rapidly driving the product's user interface (UI) allows more aspects of the user interface to be exercised in more test sequences within a given time. However, these test automations generally do not operate effectively with operations such as UI screen capture collection that require more time than the automation allows between inputs.

Some embodiments described herein facilitate user interface analysis by utilizing appropriate communicating shims. Existing native code or other binary code can be retrofitted with shims that communicate with one another to manage user interface analysis in a manner that allows screen captures and other analysis operations adequate time to complete, yet does not hinder the automated testing.

In some embodiments, an automation target shim injected into a target process detects activity in a user interface of the target process, and sets a target-busy flag, bit, or other status indicator. An automation source shim injected into a source process detects the source process attempting to send an input toward the target process, namely, an input to drive automated testing. The automation source shim determines that the target-busy status has been set (e.g., by making a remote procedure call), and prevents the source process from sending the input to the target process until the target-busy status is clear. The automation target shim will have confirmed at some point that a screen capture or other user interface analysis operation of the target process has completed, and will then have cleared the target-busy status.

Multiple source shims and/or multiple target shims may be present in some configurations. Copies of a single automation shim component may be injected and then respectively tailored for use as source shims or as target shims. Security processes, operating system processes, and the like may be blacklisted to prevent injection of automation shims or to prevent injected automation shims from activating.

The user interface analysis operations may be invoked by the automation target shim. A variety of user interface analysis operations may be supported, such as a user interface screen capture operation, a user interface accessibility test operation, a localizability test operation, or data-gathering and possible scrutiny for compliance with a design guideline. In some embodiments, user interface analysis module(s) may be loaded and/or unloaded in a "hot" manner, that is, while the target process is running. User interface analysis modules may identify themselves, by way of a registry entry and/or by having the automation source shim send an automation driver identification to the automation target shim, for instance.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Quality control for an international software product often includes inspection of localized screen captures (UI captures) to verify the quality of the localized build. Ensuring high quality may involve inspecting as much as possible of the localized product user interface (UI) rendered during execution of the build. Collecting a large number of the possible UI captures for a product often involves creation and maintenance of automation software. However, international test teams may be only a relatively small part of a product testing corps, and therefore may lack resources to create or maintain sufficient automation to collect all desired UI captures.

It may also be very difficult to leverage existing product automation to automatically collect UI captures. Existing automation is often created to test product functionality as quickly as possible. Testing quickly may conflict with UI capture collection, because each UI screen is displayed only for small fractions of a second, which is significantly less time than is used by many current UI capture mechanisms.

One response involves running applications or services on target machines while automation is executed. These applications will attempt to capture UI as it appears on the screen, before the automation has a chance to close/advance the state of the target. However, such applications or services may fail (and may not even attempt) to modify or slow the automation processes, and therefore either miss much of the target UI or cause deleterious behavior in the automation process.

Using some embodiments described herein, UI captures are collected during the execution of an automation by employing complementary shims in both the automation and the target UI process. The automation shim detours execution of all functions that may send input into the target UI process, while the target UI shim detours execution of all functions that cause the UI to be displayed or changed. The complementary shims communicate with each other, allowing automation execution to be blocked while the target UI process shim is collecting new UI captures. In particular, some embodiments regulate communication between a third party automation and a target UI process via shimming and communication between complementary shims. Such embodiments have a variety of potential instrumentation uses, in testing contexts and other automation contexts.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. Automation for testing is used in examples, but other automation contexts are also suitable for use with embodiments.

Throughout this document, use of the optional plural "(s)" means that one or more of the indicated feature is present. For example, "shim(s)" means "one or more shims" or equivalently "at least one shim".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
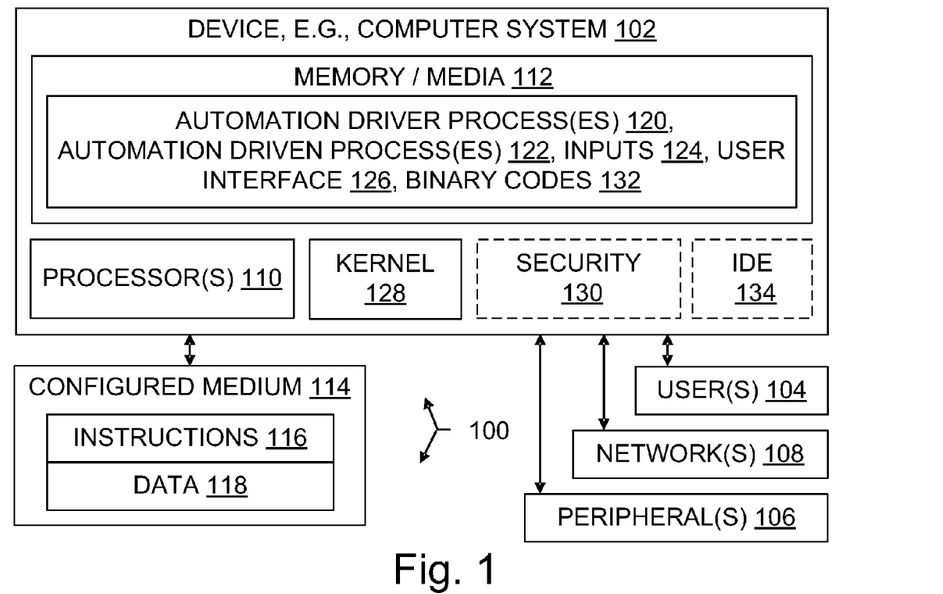
FIG. 1 is a block diagram illustrating a computer system having at least one processor, at least one memory, at least one automation driver process for automatically driving one or more applications or other processes, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of media (as opposed to merely a propagated signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by tailoring, configuring, injecting, binding, deployment, execution, modification, display, creation, loading, and/or other operations.

Automation driver processes 120 such as software processes in testing tools, applications and other automation driven processes 122, as well as inputs 124 generated by the driver processes 120 to exercise the driven processes 122, other software and other items shown in the Figures may reside partially or entirely within one or more media 112, thereby configuring those media. In particular, driven processes 122 may control or otherwise effectively include a user interface 126. A kernel 128 often is present, to provide services such as hardware resource management, to the processes 120, 122. Security 130 processes may also be present, e.g., anti-virus code, firewall code, and the like. Processes 120, 122, like many other pieces of software, may be implemented using native and/or other binary codes 132 which configure the medium 112. In addition to the configured medium and the processor(s), an operating environment may also include other hardware, such as buses, power supplies, and accelerators, for instance.

A given operating environment 100 may include an Integrated Development Environment (IDE) 134 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use automation to exercise user interface processes that are designed for use by human users.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
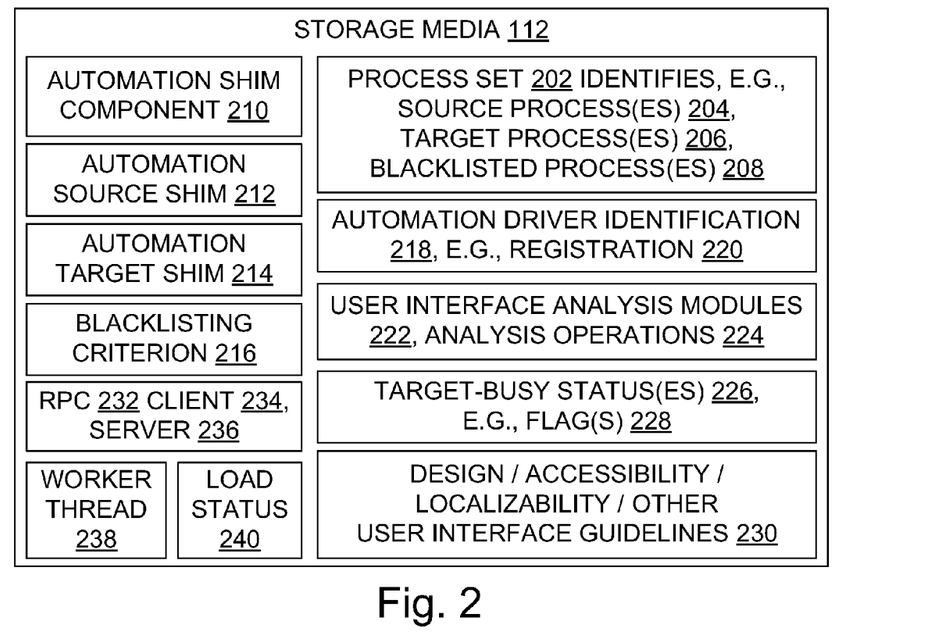
FIG. 2 is a block diagram illustrating an example architecture for shim-communication-based interface analysis management, namely, an approach to management of interface analysis which utilizes certain communications between source and target shims.

FIG. 2 illustrates an architecture which is suitable for use with some embodiments. A process set 202 identifies processes and the roles they play with respect to automation. The process set 202 may be an explicit mechanism such as a list or script, or it may be implicit in a mechanism such as a naming convention, a loading order, or a particular location in memory or on a particular processor or network node, for instance. For example, the process set may identify particular automation driver processes 120 as being source processes 204, and may identify particular automation driven processes 122 as being target processes 206. In some embodiments, the process set identifies particular processes, such as kernel 128 processes or security 130 processes, as being blacklisted processes 208, namely, processes which should act neither as a source process 204 nor as a target process 206.

In some embodiments, a copy of an automation shim component 210 can be inserted in either a source process 204 or a target process 206 and then tailored to become an automation source shim 212 or an automation target shim 214, respectively. In other embodiments, separate shim components are provided, one for insertion into source processes 204 and one for insertion into target processes 206.

Blacklisted processes 208 may be identified using one or more blacklisting criteria 216, such as process names, process IDs, process privileges, and the like. Equivalently for present purposes, in some embodiments processes are whitelisted, e.g., any process not expressly identified as a source process 204 or a target process 206 is treated as being a blacklisted process 208.

In some embodiments, source processes 204 identify themselves as such to other processes, particularly to their target process(es) 206. This may involve sending target processes an automation driver identification 218, such as a process ID and an indication that the process ID identifies a driver process. An automation driver identification 218 may also take the form of a registration 220, such as a registration with an automation service or an entry in a registry, for example. In some embodiments, source processes 204 are part of custom user interface analysis modules 222, and the identification 218 identifies an analysis module 222.

In some embodiments, user interface analysis modules 222 perform analysis operations 224. Communication between the shims 212, 214 helps coordinate inputs from the source process 204 with changes in the target process user interface 126, so that the analysis operations 224 can be completed. Without such coordination, an analysis operation 224 might not be given enough time to complete before the next input drives the user interface into a new state. Target-busy statuses 226, such as semaphores, bits, flags 228, or other status indicators, facilitate communication between the shims 212, 214. Different analysis operations 224 may involve different guidelines 230, such as guidelines pertaining to accessibility, localizability, or aesthetic or functional design criteria.

In some embodiments, communication between shims is implemented using remote procedure calls (RPC 232). One of the shims acts as an RPC client 234 and the other acts as an RPC server 236.

In some embodiments, the target shim 214 is implemented using one or more worker threads 238. In other embodiments, threads are not used.

In some embodiments, shims 212, 214 or portions thereof can be loaded and/or unloaded from working memory while their respective processes 204, 206 are running, thereby changing their load status 240. A load of a module 222 or other shim portion is considered a load of the shim, unless indicated otherwise, and an unload of a shim portion is likewise considered an unload of the shim unless indicated otherwise. In some embodiments, shims can only be unloaded while their process is running, or can only be loaded while their process is running. In some embodiments, a shim can be loaded or unloaded only when its respective process is loaded or unloaded.

With reference to FIGS. 1 and 2, some embodiments provide a computer system 102 with a logical processor 110 and a memory medium 112 configured by circuitry, firmware, and/or software in operable communication with the logical processor(s) to transform automation driver process(es) 120 and driven process(es) 122 by configuring them for inter-process communication as described herein. In some embodiments, a target process 206 residing in memory has a user interface 126, and a source process 204 residing in memory is operable to automatically generate user interface driving inputs 124 to exercise the user interface 126. A source shim 212 residing in the source process is operable to detect a target-busy status 226, and operable to disallow/allow transmission of the user interface driving inputs toward the target process when the target-busy status is respectively set/clear. A target shim 214 residing in the target process is operable to set/clear the target-busy status 226 when an operation 224 involving the user interface is respectively pending/completed.

Some embodiments include a plurality of target processes 206 having a plurality of respective target shims 214 and respective target-busy statuses 226. That is, one driver may drive multiple targets. Conversely, in some embodiments a particular shimmed target process 206 is driven by multiple shimmed source processes 204. Some embodiments include multiple target processes 206 with configurable user interface analysis modules 222, allowing a user to configure N analysis modules.

Some embodiments include a process blacklisting criterion 216, and the shims 212, 214 are configured to avoid intercession in communications to/from a blacklisted process 208. For instance, a shim might be loaded as part of a kernel 128 process or part of a security 130 process, but never set (or never read) the target-busy status 226, and thus never intercede in communications to/from a blacklisted process 208 or in other activities of any blacklisted process 208. Alternately, a shim might not even be loaded as part of any blacklisted process 208, and thus never intercede in their communications or other activities.

In some embodiments, a registration 220 identifies a given source process 204 as being an automation driver. For instance, source processes may place entries in a registry such as a Microsoft® Windows™ registry, identifying themselves as drivers, and possibly identifying the target process(es) they drive.

In some embodiments, remote procedure call (RPC) mechanisms are used for inter-shim communications. For example, in one embodiment the target shim 214 includes a remote procedure call server 236 and the source shim 212 includes a remote procedure call client 234.

In some embodiments, a user-configurable process set 202 explicitly identifies at least one process 122 as being a target process 206. In some, a user-configurable process set 202 identifies at least one process 120 as being a source process 204. Configurable target and source process sets 202 may identify processes 204, 206 via a configuration file (e.g., a registry), thereby allowing runtime determination and application of the target shim 214 and/or source shim 212. Processes 204, 206, 208 may be identified, for instance, by a process signature, namely, a collection of properties such as image-name and file path, or other familiar mechanisms for identifying software processes.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
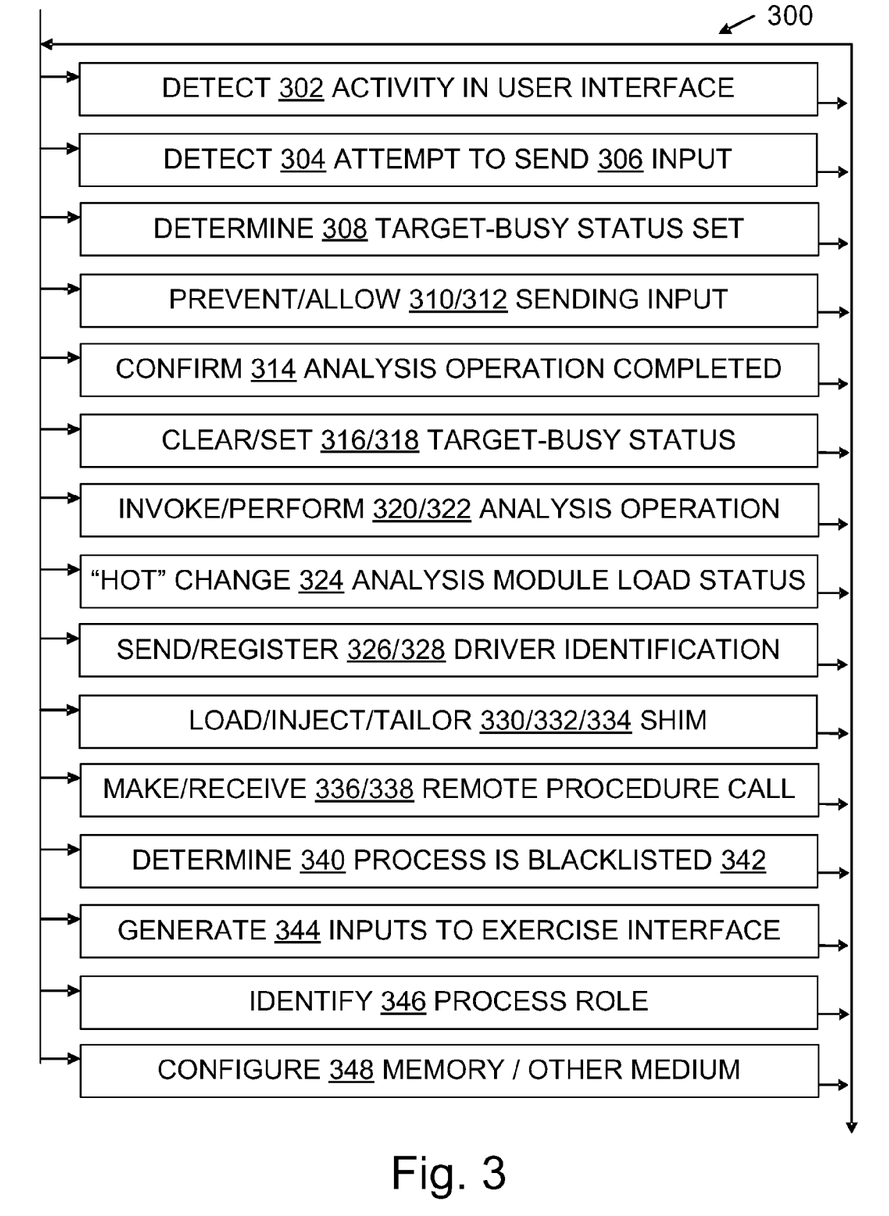
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by shims 210, 212 and processes 204, 206 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an interface activity detecting step 302, an embodiment detects activity in a user interface 126. Step 302 may be accomplished using familiar mechanism(s), for example.

During an input send attempt detecting step 304, an embodiment detects an attempt by a source process 204 to send 306 input(s) 124 to one or more target processes 206. Detecting step 304 may be accomplished using familiar mechanism(s), for example. Some embodiments can see that a source is trying to send inputs and block them until the target screen capture or other analysis operation is done. Some embodiments see that a source has sent inputs but do not let the target act on the inputs until the target screen capture or other analysis operation is done. As used here, "attempting to send input" includes both cases. Input sending step 306 may be accomplished using familiar inter-process communication mechanisms, such as messages, signals, shared memory, packets, files, sockets, pipes, or other mechanism(s), for example.

During a busy determining step 308, an embodiment determines that a target-busy status 226 is set, that is, that the status 226 indicates a busy status rather than an available status. It will be understood that particular bit values, or even particular mechanisms, are not dictated herein. A target-busy status flag 228 implemented as a single bit may be set when the bit value is 1, if that convention is consistently followed within the embodiment, but status flag 228 may likewise be set when the bit value is 0, if that is the convention followed by the embodiment. Determining step 308 may be accomplished using familiar inter-process communication mechanisms, for example.

During an input send preventing step 310 and an input send allowing step 312, and embodiment prevents or allows, respectively, a source process 204 to send input(s) 124 to drive a target process 206. Equivalently for present purposes, in some embodiments the input(s) 124 are sent from the source process, and possibly even received at a buffer accessible to the target process, but the target process is then prevented 310 or allowed 312, respectively, to act on the input(s) 124. Preventing step 310 may be accomplished by asserting familiar mechanisms for intercepting inter-process communication, for example, and allowing step 312 may be accomplished by withdrawing such assertions or by not making them. For example, a source shim may be injected into a source process so that control flow goes through the source shim when the source process sends input.

During an operation complete confirming step 314, an embodiment confirms that an interface analysis operation 224 has completed. Full completion is not necessarily a criterion; in some cases an embodiment merely confirms that the operation is sufficiently complete that allowing 312 a target process 206 to act on pending input(s) 124 poses an acceptably low risk of interfering with the desired outcome of operation 224. Confirming step 314 may be accomplished using familiar inter-process communication mechanisms or by having the target shim 214 receive control from a module 222 that performed the operation 224 when the operation is completed, for example.

During a target-busy status clearing step 316 and a target-busy status setting step 318, an embodiment clears or sets, respectively, a target-busy status 226. Steps 316, 318 may be accomplished by writing values in a shared variable, a semaphore, a bit flag, or another status 226, for example.

During an analysis operation invoking step 320, an embodiment invokes code to perform 322 an interface analysis operation 224. For example, a target shim may pass control to an analysis module 222.

During an analysis operation performing step 322, an embodiment performs 322 an interface analysis operation 224. For example, an analysis module 222 may perform a UI screen capture, or equivalently for present purposes may pass control to a UI screen capture utility.

During a load status changing step 324, an embodiment changes load status of a shim. Load status 240 may be changed, for example, by loading part or all of a shim 210-214 or code controlled by the shim, or by unloading part of all of a shim 210-214 or code controlled by the shim, either separately or as part of a process 204, 206. Changes 324 in shim load status which occur while a process 204, 206 containing the shim is running (that is, in control of a processor or queued awaiting a processor) are said to be "hot" changes. For example, some embodiments allow a user interface analysis module 222 controlled by a target shim 214 to be hot loaded or hot unloaded.

During a driver ID sending step 326, an embodiment sends a target process a driver identification 218 of a source process. Step 326 may be accomplished using familiar inter-process communication mechanisms, for example. In some cases, the driver identification 218 is made available in a registry by registering 328 the driver identification 218.

During a shim loading step 330, an embodiment loads a shim 210-214 or portion thereof into memory in preparation for execution of the shim. During a shim injecting step 332, an embodiment injects a shim 210-214 into a process 204-208. Steps 330, 332 may be accomplished using familiar mechanisms, for example.

During a shim tailoring step 334, an embodiment tailors a shim component 210 to play a role as a source shim 212, as a target shim 214, or (in the case of blacklisted processes 208) as being actively neither a source nor a target shim. For example, a shim component 210 may be tailored as a source shim 212 by noting that the process in which the shim is being/has been injected is a source process according to a process set 202, and then allowing a source shim portion of the shim component 210 code (such as an RPC client 234 portion) to be active while disallowing activity in a target shim portion of the shim component 210 code. A shim component 210 may be tailored in similar fashion to act as a target shim 214.

During an RPC making step 336 or an RPC receiving step 338, an embodiment makes or receives, respectively, a remote procedure call. Steps 336, 338 may be accomplished using familiar RPC mechanisms in the context taught here of shims 212, 214.

During a blacklist determining step 340, an embodiment determines that a given process has been blacklisted 342 and hence should not be subject to input gating controls through shims 212, 214. Determining step 340 may be accomplished by finding the process in question listed in a process set 202 as off-limits to shim activity (thus blacklisted 342), or not listed therein as being approved for shim activity (another form of blacklisting 342), or by noting that the process, is of a type (e.g., kernel, security, private communications, etc.) which is off-limits for shim 212, 214 activity. One embodiment uses wild card matching on the binary path. For instance, one could specify "?:\windows\*pad.ex*", which will match "c:\windows\notepad.exe" and perhaps other items. The black list is manually maintained. Some systems, including some Microsoft Windows™ systems, include processes such as operating system processes and antivirus processes that are not shimmed, in order to avoid undesirable behavior on the system. Some embodiments include is a multi-string value in a registry that is read at process startup. If an embodiment detects that a process should not be touched, then a module implementing the shim will unload itself from the process.

During an input generating step 344, an embodiment generates input(s) 124 to drive a process 122. Step 344 may be accomplished using familiar automation driver input generation mechanisms, for example.

During a process role identifying step 346, an embodiment identifies the role played by a process. Step 346 may be accomplished using process sets 202 as discussed herein, for example.

During a memory configuring step 348, a memory medium 112 is configured by a process set 202 explicitly assigning roles to processes, by one or more shims 210-214, or otherwise in connection with inter-process communication for managing automation inputs and user interface analysis operations as discussed herein.

The foregoing steps and their interrelationships are discussed in greater detail below, in connection with various embodiments.

Some embodiments provide a process for facilitating user interface analysis. During the process, an automation target shim in a target process detects 302 activity in a user interface of the target process, and sets 318 a target-busy flag or other target-busy status. An automation source shim in a source process detects 304 the source process attempting to send 306 an input toward the target process. The automation source shim determines 308 that the target-busy status has been set, and prevents 310 the source process from sending the input to the target process until the target-busy status is clear. The automation target shim confirms 314 at some point that a user interface analysis operation of the target process has completed, and then clears 316 the target-busy status. In some embodiments, determining 308 that the target-busy status has been set includes the automation source shim making 336 a remote procedure call to the automation target shim. In some embodiments, the automation source shim sends 326 an automation driver identification to the automation target shim.

In some embodiments, the automation target shim invokes 320 the user interface analysis operation. An automation target shim may invoke 320 pending analysis modules 222 in some embodiments. In some, the target shim detects UI state and waits for the UI to be fully rendered, for instance, before it invokes 320 the analysis modules. In some embodiments, a worker thread performs 322 the user interface analysis operation. In some embodiments, the user interface analysis operation 224 includes at least one of the following: a user interface screen capture operation, a user interface accessibility test operation, a localizability test operation, compliance with a design guideline 230.

In some embodiments, the method includes changing 324 a load status of a user interface analysis module while the target process is running. More generally, shims and/or analysis modules may be "hot-pluggable" in some embodiments.

In some embodiments, the method includes injecting 332 the automation source shim in a source binary code which belongs to the source process, and injecting 332 the automation target shim in a target binary code which belongs to the target process.

In some embodiments, a second automation target shim in a second target process detects 302 activity in a second user interface of the second target process, and sets 318 a second target-busy status. The automation source shim in the source process detects 304 the source process attempting to send 306 a second input toward the second target process. The automation source shim determines 308 that the second target-busy status has been set, and prevents 310 the source process from sending the second input to the second target process until the second target-busy status is clear. The second automation target shim confirms 314 that a second user interface analysis operation of the second target process has completed, and then clears 316 the second target-busy status.

More generally, in some embodiments, it is possible for two source programs to drive the same target program, or for one source program to drive two target programs. In either case, other aspects taught herein may be used, e.g., registration of the driver may be done using a registry or other mechanism.

In some embodiments, the source process loads 330 a copy of an automation shim component 210, and the target process loads 330 another copy of the automation shim component 210. The copies of the automation shim components are then tailored 334 to a source process role and a target process role, respectively. In some embodiments, a blacklisted process loads 330 a copy of an automation shim component 210, but the automation shim component determines 340 that the blacklisted process has been blacklisted 342, and the automation shim component is tailored 334 (either explicitly, or implicitly by lack of activation as source or target) so as to avoid acting as an automation source shim and to avoid acting as an automation target shim.

Figure 4:
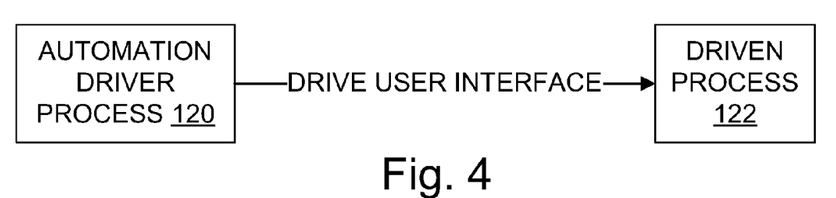
FIG. 4 is a data flow diagram illustrating an automation which lacks shim-communication-based interface analysis management.

In view of the foregoing, it will be understood that FIG. 4 is a data flow diagram illustrating an automation which lacks shim-communication-based interface analysis management. An automation driver process 120 sends inputs 124 such as commands and data to drive a user interface 126 of a driven process. As noted, in such configurations user interface analysis operations 224 such as screen captures may be difficult or impractical to achieve because the flow of inputs does not allow time to perform the desired analysis operations adequately.

Figure 5:
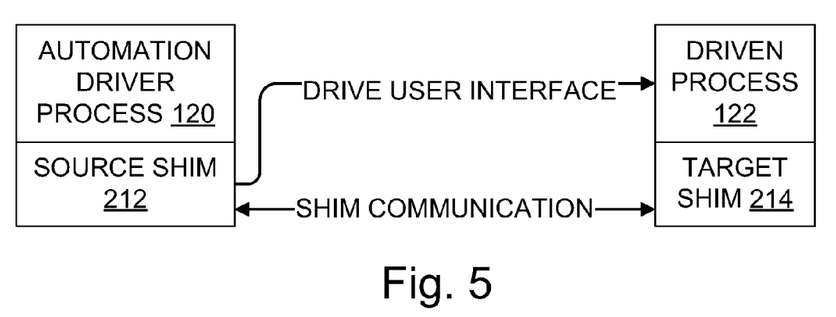
FIG. 5 is a data flow diagram generally illustrating automation with shim-communication-based interface analysis management.

FIG. 5 is a data flow diagram generally illustrating automation with shim-communication-based interface analysis management as taught herein. A source shim 212 has been injected in the automation driver process 120, thereby forming a source process 204. Similarly, a target shim 214 has been injected in the driven process 122, thereby forming a target process 206. Communication between the shims mediates the inputs that drive the user interface, thereby allowing desired analysis operations an opportunity to complete before the driven process acts on subsequent input. Shim communication in some embodiments consists of communications through the setting and clearing of the target-busy status, but in other embodiments additional communications occur. For example, a source shim may identify itself and/or its driver process 120 to the target shim.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable storage media (as opposed to propagated signal media). The storage medium which is configured may be in particular a removable storage medium 114 such as a CD, DVD, or flash memory. A general-purpose memory, which may be removable or not, and may be volatile or not, can be configured into an embodiment using items such as automation shims 210-214 and process sets 202, in the form of data 118 and instructions 116, read from a removable medium 114 and/or another source such as a network connection, to form a configured medium. The configured medium 112 is capable of causing a computer system to perform process steps for transforming processes through shim usage for interface analysis as disclosed herein. FIGS. 1, 2, 3, and 5 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Figure 6:
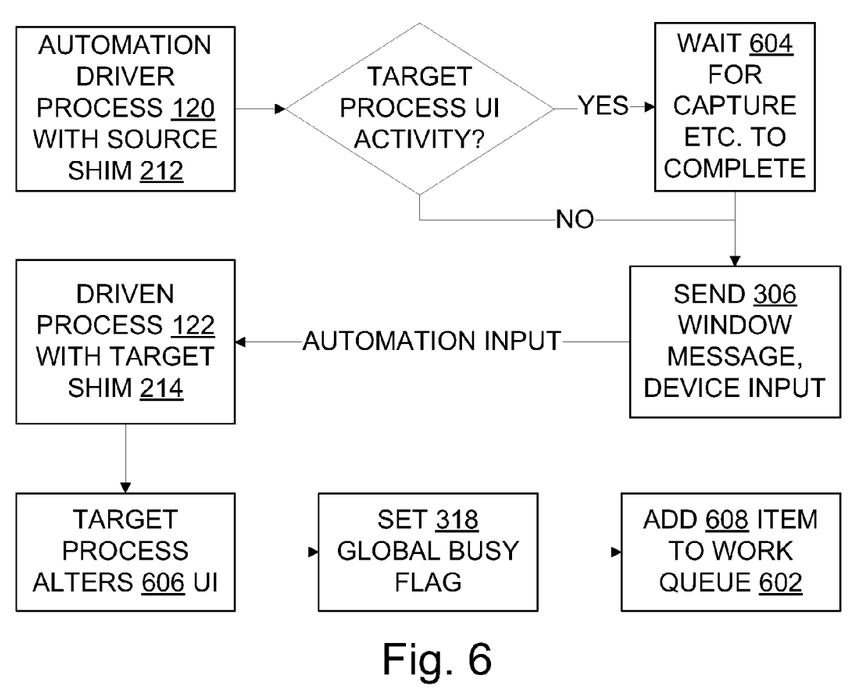
FIG. 6 is a data flow diagram illustrating an automation with shim-communication-based interface analysis management in an architecture which includes a queue of analysis operations that is processed by at least one worker thread.
Figure 7:
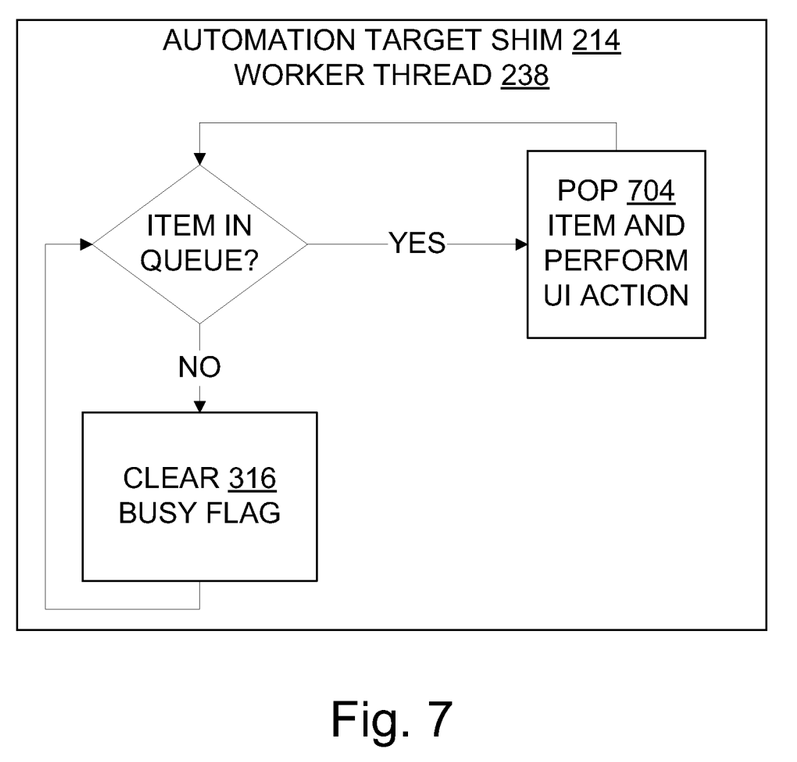
FIG. 7 is a data flow diagram illustrating a worker thread suitable for use in the architecture shown in FIG. 6.

FIG. 6 is a data flow diagram illustrating an automation with shim-communication-based interface analysis management in an architecture which includes a queue 602 of analysis operation items that is processed by a worker thread. FIG. 7 is a data flow diagram illustrating a worker thread 238 suitable for use in the architecture shown in FIG. 6. As indicated in FIG. 6, a driver process 120 with a source shim 212 checks for target process user interface activity. If UI activity is detected 302, then the source process waits 604 for the activity (e.g., screen capture) to complete; completion can be signaled using the target-busy flag. If UI activity is not detected 302, or was detected but has completed, then the source process sends 306 window messages, device inputs, and/or other automation inputs 124 to drive the target. As a result of the inputs, the target process may alter 606 the user interface. The target shim sets 318 the target-busy flag 228, and adds an item to the work queue so that the analysis module will capture or otherwise perform 322 an analysis operation on the altered interface. The worker thread 238, as shown in FIG. 7, checks for work queue items, pops 704 them off the queue 602 and performs 322 them, and when the queue is empty the worker thread clears 316 the target-busy flag 228.

Some embodiments use or are implemented using an extensible Detours™ native code shimming technology which is publicly available from Microsoft® Research (marks of Microsoft Corporation). Two complementary shims are injected into an automation process 120 and a target UI process 122. The first shim is for the automation process, and in one implementation is called the AutomationShim; it is represented herein by the source shim 212. The second shim is for the target UI process and in the implementation is called the AutomationTargetShim; it is represented herein by the target shim 214. Communication between the two shims is established via an RPC (remote procedure call) server 236 in the AutomationTargetShim, and an RPC client 234 in the AutomationShim.

In some embodiments, the AutomationTargetShim may be injected 332 into as many UI target applications as desired. For instance, if the target UI is the Microsoft® Windows operating system UI, then the AutomationTargetShim may be injected into every application that is part of a Microsoft® Windows product. This shim detours Win32® functions that are used to create or modify the process' UI; for example, the CreateWindowExW Application Program Interface (API) is detoured (Win32 is a mark of Microsoft Corporation). Depending on runtime parameters, these functions may cause a change in the target's UI. Such a change signals an event for the AutomationTargetShim to set a global "Busy" flag 228 and queue UI actions (such as capturing the UI in a screen shot) for a worker thread 238. While standard UI actions are being performed the "Busy" flag notifies any processes with the AutomationShim that they are blocked from sending input 124 to the process. In some embodiments, the target-busy status is per-process while in others it is shared by multiple processes, depending on user preferences. Once the standard UI actions have completed, the "Busy" flag is unset (cleared 316), and automation processes are unblocked.

In some embodiments, the AutomationShim may be injected into every process that is not specified as a target UI application. As the AutomationShim only performs action on code patterns that send input to other processes, there will be no noticeable impact on processes that are not actually automating another process. However, if the process is attempting to send 306 input into a target process and the target process has the AutomationTargetShim injected (with an active RPC server), calls will be blocked while the target process "Busy" flag is set, until the target process has a chance to perform any applicable UI actions and unset the flag. As a result, processes with the AutomationShim will respond slower than usual while driving an application with the AutomationTargetShim, but will often not display any other deleterious effects.

AutoCapture Technology

In some embodiments, an AutoCapture tool and method are provided consistent with the foregoing teachings, for allowing one to automatically capture or otherwise evaluate UI screens in real time as they are launched, either by third party automation or by a human manually using a product. AutoCapture technology may be helpful, for example, to software product service teams that wish to evaluate much or all of a product's UI but do not necessarily have the resources to write their own custom automation.

Some tools will attempt to capture all UI that is launched on a system. However UI automation commonly relies on tightly tuned UI event waiters to signal when the automation should wait and continue. These waiters will allow an automation to automate target UI at a pace quick enough to prohibit these tools from doing sufficient UI capture or evaluation. In some situations, AutoCapture technology will not only capture all desired UI, but will also prevent UI automation from interrupting that capture process. AutoCapture technology allows central teams to leverage existing automation by managing application timing and/or by self-host navigation.

Two of many possible scenarios will now be described. As a first example, suppose an international product team wishes to create UI captures of a software product for localization review. Custom UI automation to exercise and capture target UI screens has limited coverage due to resource limitations. By using AutoCapture technology in test labs with a custom capture module, UI exercised by feature teams can also be captured, increasing the total coverage.

As another example scenario, suppose an accessibility team wishes to evaluate all UI in a software product to ensure that teams are correctly using certain Accessibility APIs. The accessibility team has some automation and creates manual tools to allow feature teams to evaluate their UI; however they do not get exhaustive coverage of UI of the product. By using AutoCapture technology in test labs with a custom module they evaluate UI launched by feature teams, increasing their coverage and the number of bugs found.

In many scenarios, it will be understood that risks can be mitigated or eliminated by sufficient testing of automation frameworks, input mechanisms, UI targets, and other aspects of a given environment. Uninstall instructions, performance logs, and other software development tools may also be present.

In one embodiment, the following features are goals for AutoCapture technology, but it will be understood that other embodiments may omit, add, or otherwise alter the set of features and/or the set of goals: load custom modules 222 from any local directory, be deployed in a lab environment, recognize all processes of a specified product as target processes 206, have little performance impact on a system, be installed without requiring a restart, be made to exclude specific processes, have little or no performance or resource-usage impact on a system in the absence of custom modules such as analysis modules 222.

In some embodiments, the AutoCapture tool is a lightweight shim 210 that has different behaviors depending on whether it is in a target process 206 or an automation process 204. In a target process the shim monitors UI as it is launched, manages requests from automation process shims, and invokes any custom capture modules 222 that are installed. In the automation process the shim monitors process communication APIs, and will block those calls pending information requests sent to shims in the target processes. In this way capture operations 224 can be created in much or all UI launched on the system, while any automation will be slowed allowing the capture mechanisms to execute.

In some embodiments, the shims themselves are deployed using Microsoft® Research Detours (version 2.1) Application Compatibility shim engine infrastructure. The shim logic is packaged in a Dynamic Link Library (DLL), and the shim engine forces the DLL to be loaded into all processes (or else in all applicable processes per a process set 202) at process startup. Upon loading the DLL determines which role the process will play (automation, target, or neither) and tailors the environment to apply the appropriate shims using Detours. If the process is a target type it will delay load 330 (to prevent custom module startup code from interfering with process initialization) the installed custom modules 222 and invoke them as UI becomes available. The two shim types communicate via RPC 232 to make and receive calls; the target type becomes an RPC server, and the automation type becomes a matching RPC client.

In one embodiment, the following shims are employed:
Automation Type
 1. PostMessageW
 2. SendMessageW
 3. SendMessageTimeoutW
 4. SendInput
Target Type
 1. CreateDialogIndirectParamAorW
 2. DialogBoxIndirectParamAorW
 3. CreateWindowExW As to RPC in this embodiment, the Target type becomes an RPC server with the following methods exposed:
int RegisterAsDriver([in] handle_t hBinding, [in,string] WCHAR * automationName);
int CanAutomationContinue([in] handle_t hBinding, [in] int hWnd);
int EngineTestConnection([in] handle_t hBinding, [in] int iIn);

As to RegisterAsDriver, when an automation type process drives a target type process, the automation type will register 328 itself with the target as the driver. The driver information such as driver identification 218 is made available to any custom modules 222 for book-keeping purposes.

As to CanAutomationContinue, this is a non-blocking call querying the current status of a target process. When a target process type is capturing new UI it will set 318 a busy flag. Calls to this method will return the state of this flag. The automation process shims will poll this value (blocking the original function call) until it returns TRUE, allowing the automation to continue.

As to EngineTestConnection, this is a test method that can be called, and will return the value passed.

As to custom module definition in this embodiment, custom modules 222 are native DLLs that publicly export by name a method of the following prototype:
typedef HRESULT (WINAPI *PINVOKE_HWND_HANDLER) (HWND hwnd, LPCWSTR lpStorageFolder, LPCWSTR lpDriver, INT windowNumber);

In this embodiment, users compile separate versions of the module for different architectures. Installation of a custom module is handled via registry settings. The following registry values are set, per architecture:
Machine Architecture:
HKLM\Software\Microsoft\AutoCapture\HWndHandlers
32 bit on 64:
EKLM\Software\Wow6432Node\Microsoft\AutoCapture\HWndHandlers
In either case HWndHandlers is a REG_MULTI_SZ value, and should be appended with the full path and function that contains the custom logic. For example:
C:\Program Files\MyShimFolder\MyShimLogic.dll@MyShimFunction In some embodiments, the AutoCapture logic will be completely controlled via registry settings. Through the registry there are two sets of logic that may be configured, namely, a process name based filter for determining process type, and a custom window handler logic installation.

As to security, after AutoCapture technology is installed it will use an RPC server on all target processes, which may pose some risk. The target logic should handle any security concerns on those functions and code should comply with applicable Security Access Level (SAL) guidelines.

As to privacy, it is expected that many embodiments will operate in controlled test environments which do not contain personal or private information, but instead rely solely on dummy information and/or previously public information. Nonetheless, proper respect should be given to user privacy. If an embodiment is deployed with inputs and/or data that were not originally machine generated but could instead include private or confidential information, then privacy concerns should be adequately addressed, e.g., when capturing client UI in a beta testing environment. Privacy issue management may be delegated to the users involved, e.g., by explaining the capture process before it is performed, obtaining user consent, providing opportunities for user review and editing of captured screens, and so on to mitigate or eliminate privacy risks.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 5-7 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic:

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for facilitating user interface analysis, the method utilizing a device which has at least one logical processor in operable communication with at least one memory, the method comprising the steps of:
   an automation target shim in a target process detecting activity in a user interface of the target process, and setting a target-busy status;
   an automation source shim in a source process detecting the source process attempting to send an input toward the target process;
   the automation source shim sending an automation driver identification to the automation target shim;
   the automation source shim determining that the target-busy status has been set, and preventing the source process from sending the input to the target process until the target-busy status is clear; and
   the automation target shim confirming that a user interface analysis operation of the target process has completed, and then clearing the target-busy status.

2. The method of claim 1, wherein the method further comprises the automation target shim invoking the user interface analysis operation.

3. The method of claim 1, wherein the user interface analysis operation includes at least one of the following: a user interface screen capture operation, a user interface accessibility test operation, a localizability test operation, compliance with a design guideline.

4. The method of claim 1, further comprising changing a load status of a user interface analysis module while the target process is running.

5. The method of claim 1, wherein the automation driver identification takes the form of a registration.

6. The method of claim 1, further comprising the steps of:
   injecting the automation source shim in a source binary code which belongs to the source process; and
   injecting the automation target shim in a target binary code which belongs to the target process.

7. The method of claim 1, further comprising the step of a worker thread performing the user interface analysis operation.

8. The method of claim 1, further comprising the steps of:
   a second automation target shim in a second target process detecting activity in a second user interface of the second target process, and setting a second target-busy status;
   the automation source shim in the source process detecting the source process attempting to send a second input toward the second target process;
   the automation source shim determining that the second target-busy status has been set, and preventing the source process from sending the second input to the second target process until the second target-busy status is clear; and
   the second automation target shim confirming that a second user interface analysis operation of the second target process has completed, and then clearing the second target-busy status.

9. The method of claim 1, wherein determining that the target-busy status has been set comprises the automation source shim making a remote procedure call to the automation target shim.

10. A computer-readable storage memory configured with data and with instructions that when executed by at least one processor causes the processor(s) to perform a method for preventing user interface automation from interrupting screen captures, the method comprising the steps of:

an automation target shim in a target process detecting activity in a user interface of the target process, and setting a target-busy flag;

an automation source shim in a source process detecting the source process attempting to send an input toward the target process;

the automation source shim sending an automation driver identification to the automation target shim;

the automation source shim determining that the target-busy flag has been set, and preventing the source process from sending the input to the target process until the target-busy flag is clear; and the automation target shim confirming that a user interface screen capture operation of the target process has completed, and then clearing the target-busy flag.

11. The configured storage memory of claim 10, wherein the automation driver identification comprises a process ID.

12. The configured storage memory of claim 10, wherein the method further comprises the source process loading a copy of an automation shim component, the target process loading another copy of the automation shim component, and the copies of the automation shim components being tailored to a source process role and a target process role, respectively.

13. The configured storage memory of claim 10, wherein the method further comprises a blacklisted process loading a copy of an automation shim component, the automation shim component determining that the blacklisted process has been blacklisted, and the automation shim component then being tailored to avoid acting as an automation source shim and to avoid acting as an automation target shim.

14. A computer system comprising:
at least one logical processor;
at least one memory in operable communication with the logical processor(s);
a target process residing in memory and having a user interface;
a source process residing in memory and operable to automatically generate user interface driving inputs to exercise the user interface;
a source shim residing in the source process, operable to detect a target-busy status, and operable to disallow/allow transmission of the user interface driving inputs toward the target process when the target-busy status is respectively set/clear, the source shim also operable to send an automation driver identification to a target shim; and
the target shim residing in the target process, operable to set/clear the target-busy status when an operation involving the user interface is respectively pending/completed.

15. The system of claim 14, wherein the system further comprises a plurality of target processes having a plurality of respective target shims and respective target-busy statuses.

16. The system of claim 14, wherein the system further comprises a process blacklisting criterion, and wherein the shims are configured to avoid intercession in communications to/from a blacklisted process and other activities of the blacklisted process.

17. The system of claim 14, wherein the system further comprises a registration identifying the source process as an automation driver.

18. The system of claim 14, wherein the target shim comprises a remote procedure call server and the source shim comprises a remote procedure call client.

19. The system of claim 14, wherein the system comprises multiple target processes in the form of configurable user interface analysis modules.

20. The system of claim 14, wherein the system further comprises a user-configurable process set which satisfies at least one of the following:
the process set identifies at least one process as being a target process;
the process set identifies at least one process as being a source process.

* * * * *